(12) United States Patent
Zhao et al.

(10) Patent No.: US 8,632,261 B2
(45) Date of Patent: Jan. 21, 2014

(54) INTEGRATED AND SEALED OPTO-ELECTRONIC DEVICE ASSEMBLY

(75) Inventors: Jim Zhao, Irvine, CA (US); Yuan-Chieh Lin, Lake Forest, CA (US); An-Jen Yang, Irvine, CA (US); Pei Tsao, La Harbra, CA (US); Yin-Tse Kao, La Mirada, CA (US); Ashish Raheja, Foothill Ranch, CA (US)

(73) Assignee: Hon Hai Precision Industry Co., Ltd., New Taipei (TW)

( * ) Notice: Subject to any disclaimer, the term of this patent is extended or adjusted under 35 U.S.C. 154(b) by 719 days.

(21) Appl. No.: 12/799,246

(22) Filed: Apr. 20, 2010

(65) Prior Publication Data

US 2011/0255832 A1    Oct. 20, 2011

(51) Int. Cl.
*G02B 6/36* (2006.01)
(52) U.S. Cl.
USPC ............ 385/88; 385/14; 385/31; 385/89; 385/92; 385/93; 385/94; 385/131; 385/139
(58) Field of Classification Search
USPC ............ 385/14, 31, 88–89, 92–94, 131, 139
See application file for complete search history.

(56) References Cited

U.S. PATENT DOCUMENTS

| | | | |
|---|---|---|---|
| 6,477,286 B1 * | 11/2002 | Ouchi | 385/14 |
| 7,382,946 B2 * | 6/2008 | Oggioni et al. | 385/14 |
| 2003/0185484 A1 * | 10/2003 | Chakravorty et al. | 385/14 |
| 2006/0067064 A1 * | 3/2006 | Crews et al. | 361/761 |

* cited by examiner

*Primary Examiner* — Ryan Lepisto
*Assistant Examiner* — Guy Anderson
(74) *Attorney, Agent, or Firm* — Wei Te Chung; Ming Chieh Chang

(57) ABSTRACT

An opto-electronic device assembly adapted for mounted on a mother board includes a case and opto-electronic devices. The case has multiple cavities opening forwards and downwards. Each opto-electronic device includes an optical engine module and an electrical socket. The optical engine module includes an optical engine, an optical transmission interface and an electrical transmission interface with electrical pads. The electrical socket has a plurality of terminals with one ends contacting with PCB and another opposite ends contacting with the electrical pads. Each electrical transmission interface is removeably assembled in the electrical sockets to complete electrical connection between the substrate and the mother board. The opto-electrical devices are received in the cavities in a condition that the optical transmission interfaces exposes to a front open of the case.

17 Claims, 6 Drawing Sheets

INTEGRATED AND SEALED OPTO-ELECTRONIC DEVICE ASSEMBLY

BACKGROUND OF THE INVENTION

1. Field of the Invention

The present invention relates to opto-electronic device assemblies, and more specifically to the integrated and sealed packaging of opto-electronic devices which have optical cables, optoelectronic and electronic components in a case and mounted on a printed circuit board.

2. Description of Related Arts

Most computer and communication networks today rely on copper wire to transmit data between nodes in the network. Since the data transmitted over the copper wire and the data processed within the nodes are both represented in the form of electrical signals, the transfer of data at the node-copper wire interface is straight forward. Other than perhaps level shifts and signal amplification, no other signal processing is required for data transmitted over the copper wire to be decoded by the node. The drawback with using copper wire is its relatively narrower bandwidth. Copper's ability to transmit data is significantly limited compared to other mediums, such as fiber optics. Accordingly much of the computer and communication networks built today, including the Internet, are using fiber optic cable instead of copper wire.

With fiber optic cable, data is transmitted using light wave, rather than electrical signals. For example, a logical one (1) may be represented by a light pulse of a specific duration and a logical zero (0) may be represented by the absence of a light pulse for the same duration. In addition, it is also possible to transmit at the same time multiple colors of light over a single strand of optic fiber, with each color of light representing a distinct data stream. Since light is attenuated less in fiber than electrons traveling through copper, and multiple data streams can be transmitted at one time, the bandwidth of optic fiber is significantly greater than copper.

While fiber optic data transmission has proven very efficient, substantial problems have been encountered when applying these light signals to process data. Transferred data is typically stored in various locations before, during and after it is processed by a computer. Since there is currently no efficient technique to "store" these light packets of data, networks will likely continue to use fiber optics for transmitting data between nodes and silicon chips to process the data within the nodes for the foreseeable future. Building such networks requires opto-electronic transceivers, which connect optical transmission devices to electronic computing devices through devices that transform optical signals to electronic signals, and vice-versa.

Ideally, such opto-electronic transceivers should provide secured and reliable connections between the various devices and should be compact in size. Secured connections ensure that the individual devices do not disconnect and therefore cause a failure in the opto-electronic transformation process. Compactly sized transceiver modules allow a higher density of optical cables to be attached to an electronic printed circuit board, thereby increasing the bandwidth available to the computing system.

While the transceiver design adequately ensures a secure connection between optical and electronic devices, assembly of its individual sub-assemblies is mechanically complex.

In view of the foregoing, a simple and compact opto-electronic transceiver capable of providing secure connections between optical and electronic devices would be desirable.

SUMMARY OF THE INVENTION

Accordingly, an object of the present invention is to provide a sealed and integrated opto-electronic device assembly.

In order to achieve the above-mentioned object, an opto-electronic device assembly adapted for being mounted on a mother board, comprises a case and opto-electronic devices. The case has multiple cavities defined by a top wall, a rear wall and a pair of end walls and partitioned by at least one partition rib, and opening forwards and downwards. Each of the opto-electronic devices comprises an optical engine module and an electrical socket. The optical engine module comprises an optical engine, an optical transmission interface and an electrical transmission interface. The electrical transmission interface has electrical pads. The electrical socket comprises a plurality of terminals with one ends contacting with the mother board and another opposite ends. Each electrical transmission interface is removeably assembled in the electrical socket and opposite ends of the terminals of the electrical socket contact with the electrical pads of the electrical transmission interface to complete electrical connection. The opto-electrical devices are received in the cavities in a condition that the optical transmission interfaces is exposed to a front opening of the case.

Other advantages and novel features of the invention will become more apparent from the following detailed description of the present embodiment when taken in conjunction with the accompanying drawings

DETAILED DESCRIPTION OF THE PREFERRED EMBODIMENT

The present invention will now be described in detail with reference to a preferred embodiments thereof as illustrated in the accompanying drawings. In the following description, numerous specific details are set forth in order to provide a thorough understanding of the present invention. It will be apparent, however, to one skilled in the art, that the present invention may be practiced without some or all of these specific details. In other instances, well known process steps have not been described in detail in order to not unnecessarily obscure the present invention.

Figure 1:
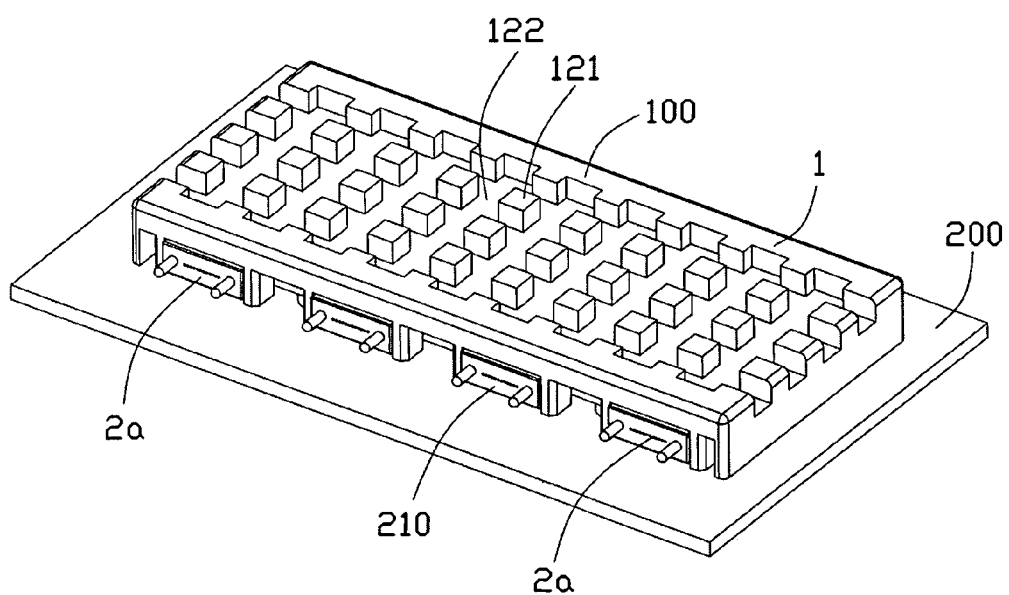
FIG. 1 is a perspective view of an opto-electronic device assembly mounted on a mother board in accordance with the present invention.
Figure 2:
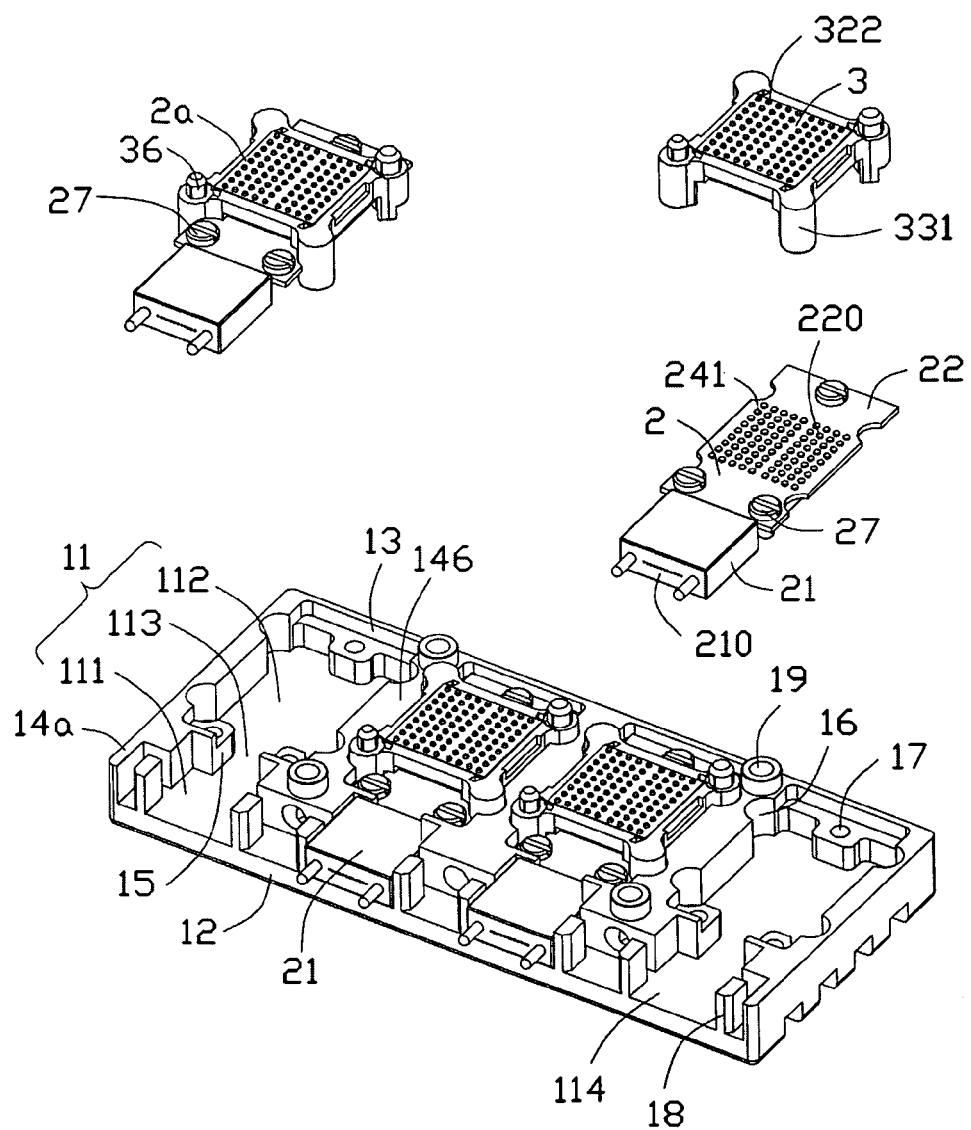
FIG. 2 is a partly exploded perspective view of then opto-electronic device assembly.

Referring now to FIGS. 1 and 2, the present invention is directed to an opto-electronic device assembly 100 mounted on a printed circuit board named as a mother board 200, which has a metal case 1, and a plurality of opto-electronic devices 2a (there are four pieces in this embodiment). Each opto-electronic device 2a includes an optical engine module 2 and a BGA electrical socket 3. The optical engine modules 2 are removeably attached in the electrical sockets 3 respectively and then are placed in cavities 11 partitioned in the case 1. As a result, the case 1 cooperating with the mother board 200 seals the opto-electronic devices 2a therein, and only four optical transmission interfaces 210 are exposed to the front face of the case to prevent dust and moisture into those sensitive optical engine modules 2 and the electrical sockets 3.

Referring to FIG. 2, the case 1 made from metal material is formed by die-cast method and defines four same cavities 11 in this embodiment, each of which is surrounded by a planar top wall 12, a rear wall 13 and two end walls 14a. The four cavities 11 are partitioned from each other by three partitioning ribs 146 which are similar to and parallel to the end walls 14a. Please notes that the case is closed and only opens forward and downwards. Thus, the four cavities 11 only open forwards and downward and are arranged side by side. Each cavity 11 is divided to a front segment 111 and a rear segment 112 by two inward-protruding short walls 15 extending from adjacent partitioning ribs 146 or end walls 14a and every adjacent two cavities 11 communicate with each other by a narrow groove 113. A front part 21 of the optical engine module 2 is received in the front segment 111, and a rear part 22 of the optical engine modules 2 with the electrical socket 3 is received in the rear segment 112. As a result, the opto-electronic devices 2a are received and retained in the cavities 11 so as to form integrated multiple optical engine modules. The front part 21 completes the front opening of the case and the mother board covers the bottom of the case to seal the opto-electronic devices in the case. Hereinafter, the structure of optical engine module 2 and the electrical socket 3 and the assembly of the device 2a will be described.

Figure 3:
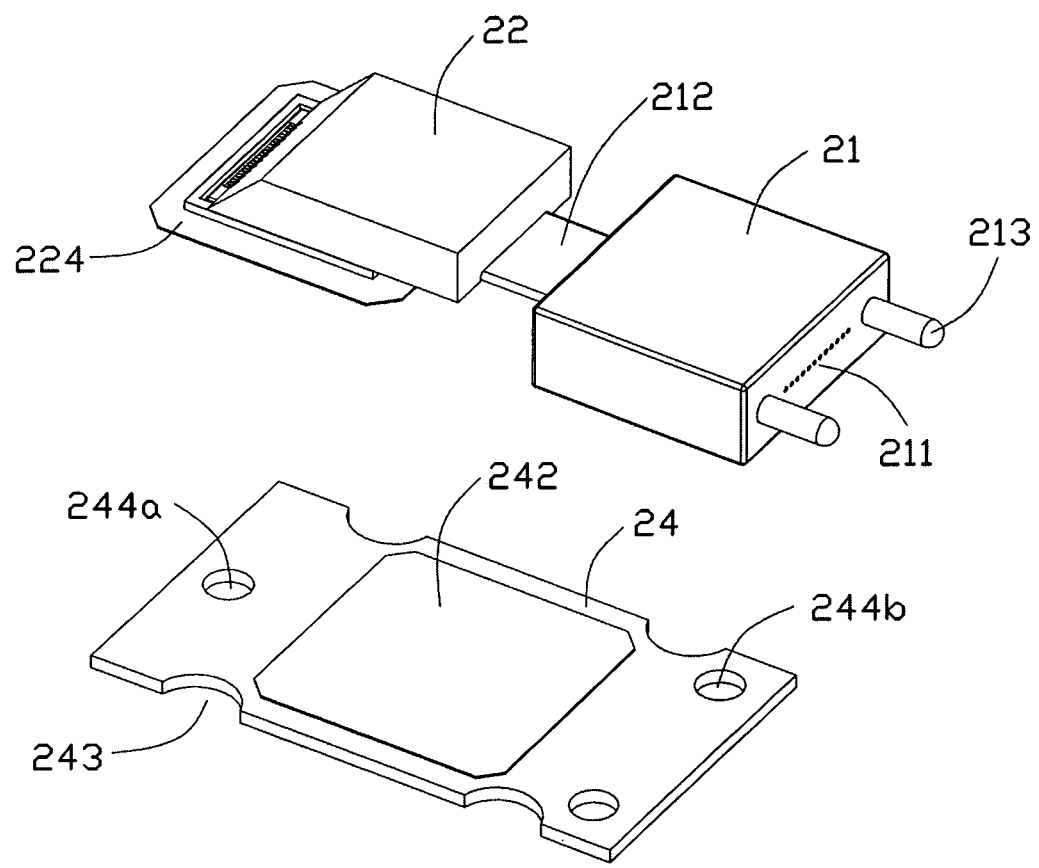
FIG. 3 is an exploded perspective view of an optical engine of the opto-electronic device assembly.
Figure 4:
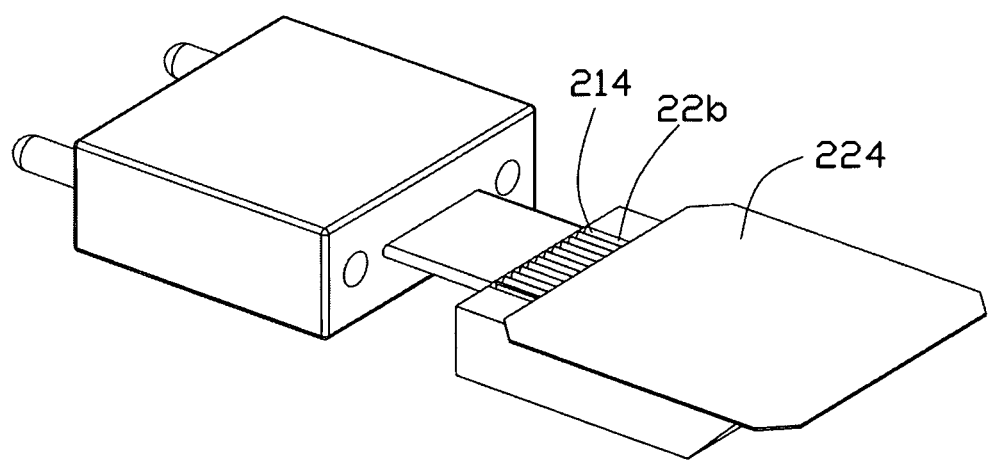
FIG. 4 is a perspective of the optical engine of FIG. 1 from a bottom view.

Referring to FIG. 3, the optical engine module 2 includes the optical cable module 21, the optical engine 22 and an electrical substrate 24. The optical cable module 21 includes multiple optical waveguides 211 embedded therein and coupled with the optical engine 22 by a flexible optical cable 212. The optical cable module 21 has a pair of guiding posts 213 projecting forwards beyond the front ends of the optical waveguides 211. The optical engine 22 is equipped with a light emission or a receive module and an IC package (not shown) so as to complete optic-to-electric or electrical-to-optic converting function. The optical cable ends 214 (as best shown in FIG. 4) are received and retained in the V shaped grooves 226 to hold the cables in the optical engine 22. The optical engine 22 is attached to the electrical substrate 24 to output electrical signals by a matrix of electrical pads 241 (labeled in FIG. 2) on the bottom face of the electrical substrate 24. In the preferring embodiment, the optical engine 22 is permanently attached to the electrical substrate 24 by a very low thermal expansion material 224. The electrical substrate 24 is provided with an electrical connecting area 242 in the centre thereof which is connecting with the optical engine 22. The electrical substrate 24 further has socket-retaining portions and case-retaining portions. The socket-retaining portions are in the form of four semicircle notches 243 respectively in longitudinal sides of the electrical substrate 24. The case-retaining portions are in the form of three circle holes 244a, 244b, one of which 244a is located at the far end of the electrical substrate and two of which 244b are located at the near end of the electrical substrate adjacent to the optical module 21. The flexible optical cable 212 also is seated on the electrical substrate 224. The optical engine 22, the optical cable module 21 and the electrical substrate 24 are formed as a unit as best shown in FIG. 2. The optical engine 22 is the control center of the assembly. The optical cable serves as a passive transmission path to other opto-electronic devices on other mother board and has the optical transmission interface 210 as labeled in FIG. 1. The electrical substrate 24 acts as an electrical transmission interface 220 as labeled in FIG. 2.

Figure 5:
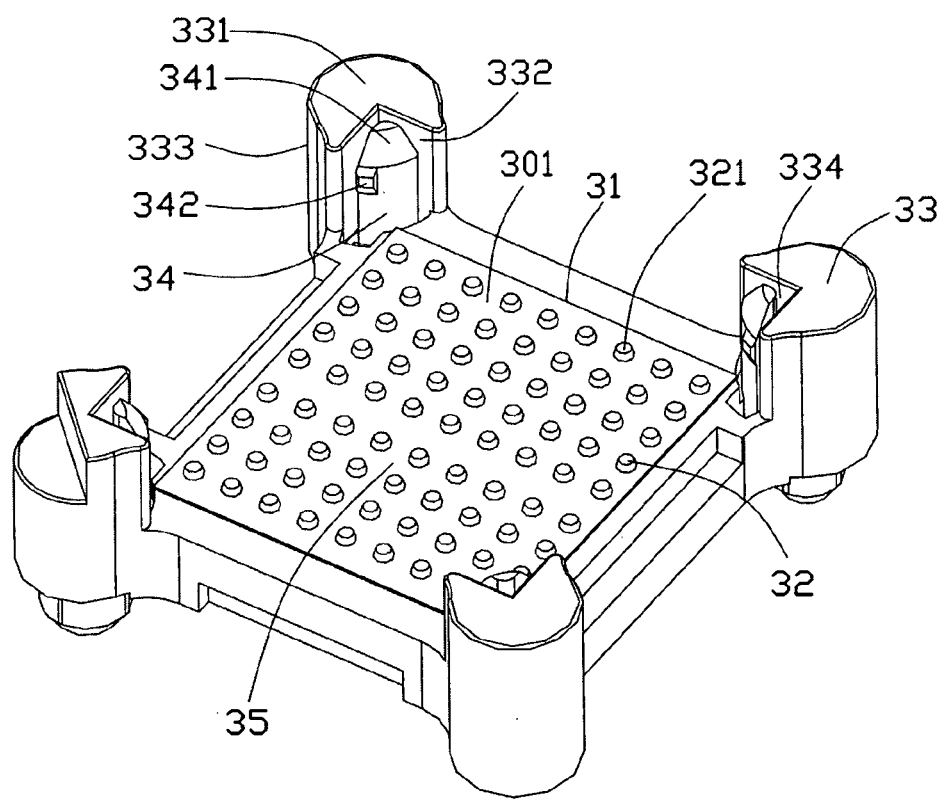
FIG. 5 is a perspective view of an electrical socket of the opto-electronic device assembly.

Referring to FIG. 5, the electrical socket 3 has a square insulating seat 31 retained with a plurality of ball grid array (BGA) terminals 32. Top ends 321 of the terminals are exposed to the top face 301 of the insulating seat and lower ends 322 (labeled in FIG. 2) are exposed to the lower face of the insulating seat. Four latch arms 33 extend upright form four corners of the insulating seat 31. Each latching arm 33 has a three-forth cylinder 331 with a 90-degree recess 334. The recesses 334 are located at the diagonal lines of the insulating seat and face to each other. Thus, each latching arm 32 has a right-angle inner surface 332 and a cylinder outer surface 333. A square receiving room 35 is thus defined and limited by said four right-angle inner surfaces 332. The cylinder outer faces 333 project outward from the insulating seat 31. A one-forth cylinder 34 with a smaller radius than the three-forth cylinder 331, is unitarily hid in the recess 334. The one-forth cylinder 34 has a cone free top 341 and a bossing portion 342 projecting extending into the receiving room 35, combined with FIG. 6, the electrical substrate 24 is pressed downward and the edges of the notches 226 go across the bossing portions 342, and electrical substrate then is pressed by the bossing portions 342 on the top face thereof to prevent the electrical substrate from upturning. Thus, the electrical substrate 24 is retained in the receiving room 35. Once the electrical substrate 24 is held, top ends 321 of the terminals of the electrical socket 3 which are attached to the corresponding electrical pads 241 of the electrical substrate 24, are pressed downwards to generate enough normal force to provide a decent, and reliable electrical transmission path. The outer movement of the latching arms 33 exerted by a user is to remove the optical engine module 2 from the receiving room 35.

Figure 6:
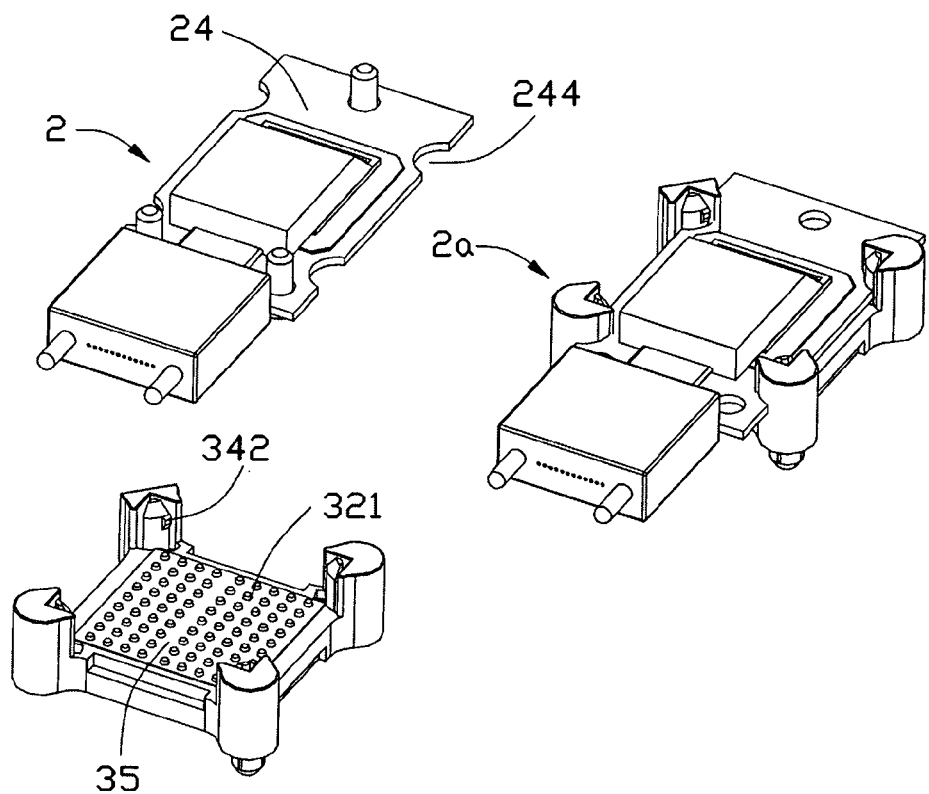
FIG. 6 is a perspective view of two opto-electronic devices of the opto-electronic device assembly.

Back to FIG. 2 and FIG. 6, the second segment 112 of the metal case 1 defines four notches 16 to receive the three-forth cylinders 331 at opposite sidewalls thereof and three holes 17 at end walls thereof. Three bolts 27 go through the holes 244 of the electrical substrate 24 and into the holes of the case 1 to lock the optical engine module 2 in the second segment 112. A pair of deformable posts 18 is provided in the front of the first segment 111 and the distance between the posts is slightly smaller than the optical cable module 21 so that the optical cable module 21 is firmly clipped by the deformable posts. The bolts 27 can be inserted into the holes before or after the optical engine module 2 is assembled to the electrical socket 3. Two diagonal positioning posts 36 extending downward beyond the bottom face of the insulating seat 31 and two retaining posts 19 extending downward from the bottom of the partitioning rib 146, are inserted into corresponding holes on the PCB 200. The positioning posts 36 also benefit guidance of the opto-electronic device 2a in alignment with the PCB when assembling. The retaining posts have threaded holes which are tightened onto the PCB by screws (not shown). The lower ends 322 of terminals of the electrical socket 3 are aligned with corresponding electrical pads (not shown) on the PCB 200. Please notes that the metal case 1 is a sturdy housing houses all components of the optical engine modules inside to prevent dust and moisture from entering those sensitive optoelectronic components once installed on the PCB and the assembling method provides a simple, easy, clean and reliable means to install and terminate the opto-electronical devices onto the PCB 200 without any additional messing methods such as soldering, welding, etc. Moreover, the metal case can pack more opto-electronic devices in the same space comparing to the loose pieces directly on the PCB.

As best shown in FIG. 1, the metal case 1 also performs as a heat sink to absorb and spread the heat, generated from the IC package, all over to dissipate to the air. The top face of the top wall 12 is recessed downwards to form a matrix of spaced blocks 121 and channels 122 between the spaced blocks. The metal case can also be attached to chassis grounds of the PCB 200 to provide EMI/RFI protection between the opto-electronic modules and the outside of the metal case 1. The partition ribs also performs as a shield to prevent EMI/RFI among the multiple opto-electronic devices.

It is to be understood, however, that even though numerous characteristics and advantages of the present invention have been set forth in the foregoing description, together with details of the structure and function of the invention, the disclosure is illustrative only, and changes may be made in detail, especially in matters of shape, size, and arrangement of parts within the principles of the invention to the full extent indicated by the broad general meaning of the terms in which the appended claims are expressed.

We claim:

1. An opto-electronic device assembly adapted for being mounted on a mother board, comprising:
   a case having multiple cavities defined by a top wall, a rear wall and a pair of end walls and partitioned by at least one partition rib, the cavities opening forwards and downwards;
   opto-electronic devices, each comprising:
      an optical engine module comprising an optical engine, an optical transmission interface and an electrical transmission interface, the electrical transmission interface having electrical pads;
      an electrical socket comprising a plurality of terminals each with one end contacting the mother board and an opposite end;
      each electrical transmission interface being removeably assembled in the electrical socket and said opposite ends of the terminals of the electrical socket contacting the electrical pads of the electrical transmission interface to complete electrical connection;
   wherein the opto-electrical devices are received in the cavities in a condition that the optical transmission interfaces is exposed to a front opening of the case.

2. The opto-electronic device assembly as described in claim 1, wherein the case is recessed downwards in the top wall thereof to define a plurality of channels performing as a heat sink.

3. The opto-electronic device assembly as described in claim 2, wherein the case is made from metal material.

4. The opto-electronic device assembly as described in claim 3, wherein the cavity comprises a first segment accommodating the optical transmission interface and a second segment accommodating the electrical transmission interface.

5. The opto-electronic device assembly as described in claim 4, wherein the first segment defines a pair of deforming posts on a front portion thereof to firmly clip the optical transmission interface.

6. The opto-electronic device assembly as described in claim 5, wherein the optical engine module comprises a optical cable module, the optical engine and an electrical substrate, the electrical substrate is attached to the optical engine at a top face thereof, and said electrical pads are arranged on a lower face of the electrical substrate.

7. The opto-electronic device assembly as described in claim 6, wherein the electrical substrate is pressed downwards to and locked in the electrical socket.

8. An opto-electronic device assembly adapted for being mounted on a mother board, comprising:
   a closed case only opening forwards and downwards, the case having multiple cavities partitioned by at least one partition rib integrally formed with the case and thus each cavity defining a front opening;
   opto-electronic devices received in the cavities of the case respectively, each opto-electronic device comprising an optical engine, an optical transmission interface and an electrical transmission interface;
   wherein the optical transmission interfaces complete the front opening of the case, and the case houses and seals the opto-electronic devices when the opto-electronic device assembly is mounted on the mother board.

9. The opto-electronic device assembly as described in claim 8, wherein the cavity has a pair of deforming posts adjacent to the front opening to clip the optical transmission interface.

10. An opto-electronic assembly comprising:
    a printed circuit board;
    a case seated upon the printed circuit board and defining a plurality of cavities therein;
    a plurality of opto-electronic devices received in the corresponding cavities, respectively, each of said opto-electronic devices including an optical transmission interface device forwardly communicating, in a mating direction, with an exterior, and an electrical transmission interface device seated upon and mechanically and electrically connected to the printed circuit board in a mounting direction perpendicular to the said mating direction; wherein
    the opto-electronic device is configured to be received into the corresponding cavity in the mounting direction.

11. The opto-electronic assembly as claimed in claim 10, wherein the optical transmission interface device includes guiding devices extending forwardly beyond a front opening formed in the corresponding cavity for mating with a complementary optical part.

12. The opto-electronic assembly as claimed in claim 10, wherein the optical transmission interface device is equipped with a set of flexible optical cable so as to mechanically provide adjustable interconnection between the optical transmission interface device and the electrical transmission interface device.

13. The opto-electronic assembly as claimed in claim 10, wherein the electrical transmission interface device includes an electrical socket and an electrical substrate which are detachably attached to each other in said mounting direction.

14. The opto-electronic assembly as claimed in claim 13, wherein the socket is equipped with a mounting post independently mounted to the printed circuit board.

15. The opto-electronic assembly as claimed in claim 14, wherein the case is equipped with another mounting post independently mounted to the printed circuit board.

16. The opto-electronic assembly as claimed in claim 14, wherein said socket is equipped with an alignment post engaged with at least one of the electrical substrate and the case.

17. The opto-electronic assembly as claimed in claim 14, wherein the electrical substrate is fastened to the case.

* * * * *